(12) United States Patent
Hao et al.

(10) Patent No.: US 8,473,991 B2
(45) Date of Patent: Jun. 25, 2013

(54) AUTOMATIC MOBILE IMAGE DIARY BACKUP AND DISPLAY

(75) Inventors: Jack Jianxiu Hao, Lexington, MA (US); Fenglin Yin, Lexington, MA (US); Wei Xia, Sudbury, MA (US); Ishan Awasthi, Wilmington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 326 days.

(21) Appl. No.: 12/861,042

(22) Filed: Aug. 23, 2010

(65) Prior Publication Data

US 2012/0047539 A1    Feb. 23, 2012

(51) Int. Cl.
*H04N 7/18*    (2006.01)
(52) U.S. Cl.
USPC .............................. 725/82; 725/115; 725/145
(58) Field of Classification Search
USPC ............................ 725/82, 105, 109, 115, 145
See application file for complete search history.

(56) References Cited

U.S. PATENT DOCUMENTS

| | | | |
|---|---|---|---|
| 2010/0225811 A1* | 9/2010 | Konvisser | 348/512 |
| 2010/0231790 A1* | 9/2010 | Ansari et al. | 348/552 |
| 2011/0072078 A1* | 3/2011 | Chai et al. | 709/203 |

* cited by examiner

*Primary Examiner* — James R Sheleheda
*Assistant Examiner* — Charles N Hicks

(57) ABSTRACT

A method performed by a user device connected to a content server, via a public network, that includes sending, to a digital video recorder (DVR) server and via the public network, a request to display images on a display device associated with a local server; receiving, from the DVR server and via the public network, a notification to upload the images, the notification including an address for the content server; selecting a group of images stored on the user device; sending, to the content server and based on the address, the group of images; and sending, to the local server and via a local network, a notification to retrieve the group of images from the content server for display on the display device.

25 Claims, 10 Drawing Sheets

AUTOMATIC MOBILE IMAGE DIARY BACKUP AND DISPLAY

BACKGROUND

Computing and communication devices are capable of performing an increasing variety of functions and tasks that continue to improve the user's experience. Computing and communication devices can run a variety of applications, can connect to a variety of wired and wireless networks, and can take pictures and/or video, which can be stored in the device, displayed on the device, or sent to and/or received from other devices. As a result, users may rely on devices more and more to receive, process, display, communicate, and/or store image data. Unfortunately, devices can reach memory or processing capacity when a large quantity of images are stored on or handled by the device, respectively. Furthermore, users run the risk of losing images that are handled by and/or stored in the device if the images are not regularly backed up.

DETAILED DESCRIPTION OF PREFERRED EMBODIMENTS

Figure 1:
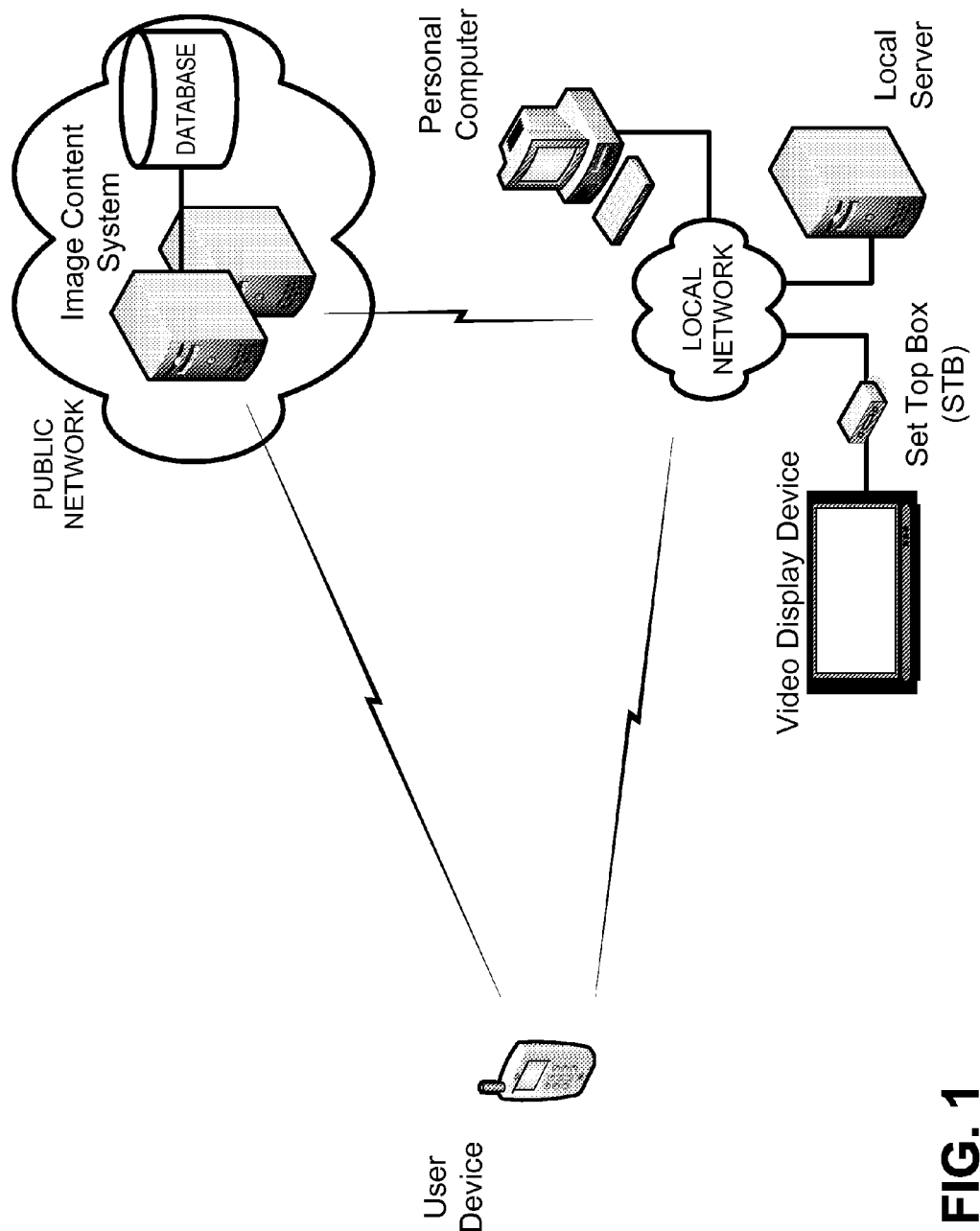
FIG. 1 is a diagram that illustrates an overview of an automatic mobile image diary backup and/or display implementation described herein.

The following detailed description refers to the accompanying drawings. The same reference numbers in different drawings may identify the same or similar elements. Also, the following detailed description does not limit the invention.

An implementation described herein may include systems and/or methods that provide for image display and/or automatic image diary backup in which images taken, received, and/or stored on a user device can be backed up by storing a copy of the images on another device. Additionally, or alternatively, the automatic image diary backup may enable images to be downloaded to a local server and then displayed by the local server on a video display device associated with the local server. An automatic image backup operation may be performed in a manner that is transparent to a user of the user device. The backup operation may protect images, stored on the user device, from being lost in the event that the user device is misplaced and/or otherwise becomes inoperable. The automatic image backup operation may be performed using a local/private network (e.g., a home Wi-Fi network or a home wired network) that may reduce bandwidth demand on access/metro networks. If a local network is not available, the automatic image backup operation may be performed on a public network (e.g., a service provider network) or other networks that are available.

Additionally, or alternatively, an image display operation may be performed in a manner that permits a user of a user device to transfer images (e.g., photographs, video, text descriptions, associated music and/or narrations, screen saver images, etc.) from the user device to a local server (e.g., a set top box (STB)) to be viewed on a video display device that is connected to the STB. The user may use the user device to send instructions to the STB in order to view the images individually, as a slide show, in an array of more than one image, etc.

In an example implementation, an image diary application, hosted by a user device, may include software that performs a setup operation to establish image backup and display settings that may be used by the image diary application to perform image backup and/or image display operations. For example, the image backup and/or display settings may include the timing and/or frequency by which the images are to be backed up, a location of the user device when images are backed up (e.g., when the user device is located at the residence of a user of the user device and/or some other location), a local server via which images may be displayed on a video display device, and/or image backup location information (e.g., a local backup to a home server, a remote backup to a content server, etc.). In another example, the image diary application may enable the user device to perform a registration operation. The image diary application may, for example, permit a user device to be registered with a digital video recorder (DVR server) that may control or facilitate the automatic image backup operations.

In another example implementation, a local image backup operation may be performed using a local server associated with a private network. For example, a user device may establish a connection, via a local, home, and/or private network, with a local server (e.g., a personal computer, etc.) associated with the user device to enable the local server to receive images uploaded from the user device. The uploaded images may be obtained directly from the user device via the local, home, and/or private network and/or may be retrieved from a content server via a public network, such as the Internet, a service provider network, etc.

In yet another example implementation, a remote image backup operation may be performed using a content server associated with a public network. For example, a user device may communicate with a DVR server in order to backup images to the content server. The DVR server may authenticate the user device and may send network address information associated with the content server to the user device. The user device may use the network address to upload images to the content server. The content server, the user device, and/or the local server may perform a synchronization operation to ensure that desired images are backed up on each device.

In still another implementation, a user device may perform a local image backup operation, a remote image backup operation, or a combination of a local and remote image backup operation based on the image backup and display settings as specified by the user of the user device. In one example, the user device may backup images to a local server or a content server depending on the type of network (e.g., a public network or a private network) that is available. If a private network is available, the user device may backup the images to the local server. If, however, a local network is not available, then the user device may backup the images to the content server.

In still another example implementation, a user device may communicate with a DVR server, a content server, and/or a local server to perform an image display operation. For example, the user device may be authenticated by the DVR server and may transfer images to the content server along with an indication to the local server (e.g., a STB) that the images may be downloaded from the content server. The local server may retrieve the images from the content server and may present the images for display on a television screen and/or another video display device associated with the local server.

The term "image," as used herein, may include any picture, video, image data, associated text data (e.g., image descriptions, tags, etc.), and/or associated audio data (e.g., music, narrations, etc.) that is capable of being received, stored, processed and/or transmitted by a user device and/or a server device.

FIG. 1 is a diagram that illustrates an overview of an automatic mobile image diary backup and/or display implementation described herein. As illustrated in FIG. 1, a user device may store images received (e.g., via a message and/or a download) and/or taken by the user device (e.g., by a camera installed in the user device) in a memory associated with the user device. The user device may be connected to an image content system and/or a local, home, and/or private network (e.g., shown as "local network"). The image content system may be connected to the user device and/or to the local network. The local network may include a personal computer, a local server, a STB connected to a video display device, and/or another device. The personal computer, the local server, and/or the STB may be interconnected by a local network that may include wired and/or wireless connections.

A setup operation may be performed by the user device. For example, a mobile diary application, hosted by the user device, may receive, from a user of the user device, image backup and/or display settings that the mobile diary application may use while performing automatic image backup and/or image display operations. In one example, the mobile diary application may present an image backup and display settings user interface (UI) (hereinafter referred to as an "image settings UI") for display on the user device via which the image backup and/or display settings may be received from the user. The image backup and display settings may indicate whether images are authorized to be backed up to a local server and/or the image content system. The image backup and/or display settings may specify that an image backup operation is to be automatically performed at a particular time, upon the occurrence of some event (e.g., when new images are saved to the user device), when the user device is at a particular location, when the user device is being charged, etc. In another example, image backup and/or display settings may specify that the images are permitted to be displayed on a video display device that is connected to a local server and/or set of local servers.

A local image backup operation may be performed by the image diary application. For example, the user device may receive new images and the image diary application may initiate a local image backup operation based on a determination that the user authorizes a local image backup operation (e.g., based on the image backup and/or display settings). If the image backup and/or display settings indicate that a local image backup operation is to be performed, the user device may communicate with the local server in order to backup selected images to the local server. The local server may perform a synchronization operation to ensure that images, identified by the user, are backed up are backed up on each of the local server, image content system, and/or user device.

In a further example, if a connection with the local server cannot be established (e.g., the local network and/or local server are powered off, offline, etc.), then the user device may upload images to the image content system based on a determination that a remote image backup is authorized by the user (e.g., based on the image backup and/or display settings). The user device may upload images to the image content system. The image content system may receive the images and may store the images in a memory associated with the image content system. The image content system may perform a synchronization operation to ensure that images, identified by the user, are backed up on each of the local server, image content system, and/or user device.

Backed up images may be downloaded for display to a local server, such as a STB, for display on a video display device. For example, the user device may send an instruction, to the STB, to download images, from the image content system, that are backed up on the content delivery system so that the images may be displayed on the video display device. In another example, the STB may send a request to the image content system to download the backed up images. The image content system may receive the request, may retrieve the backed up images, and may send the retrieved images to the STB for display on the video display device. In yet another example, the user device may instruct the STB to retrieve images that are backed up on a local server (e.g., personal computer connected to the local network).

The automatic image backup operation may enable a user to protect images stored on the user device and/or to display backed up images on a video display device associated with a local network. Images may be backed up to a local server and/or remotely on an image content system. The automatic image backup operation may be performed in a manner as specified by the user (e.g., at a particular time of day, based on a particular time interval, when the user device is at a particular location etc., upon the occurrence of some event, etc.), and/or during particular off-peak time periods (e.g., overnight) when service provider network and/or public network bandwidth resources are in less demand.

Figure 2:
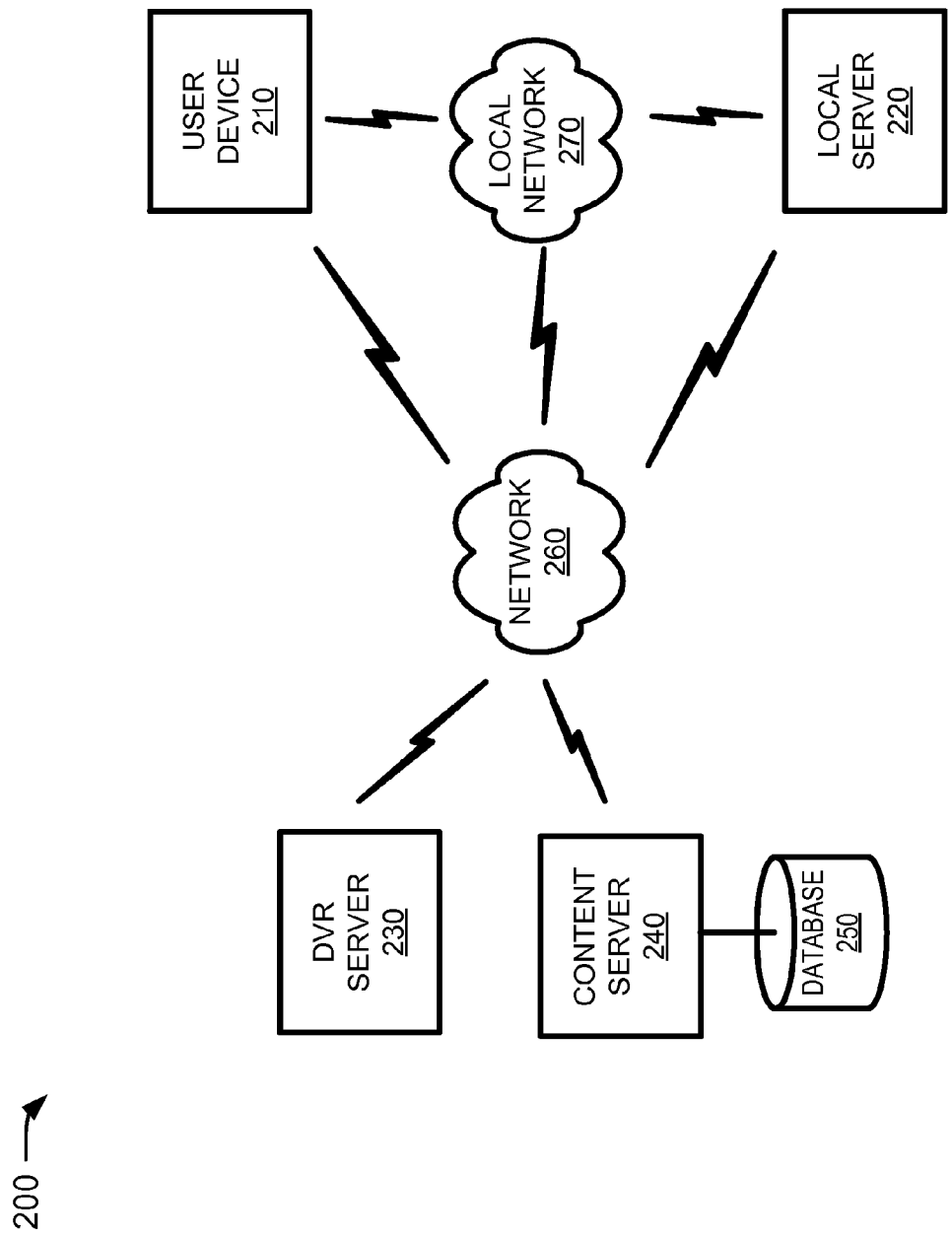
FIG. 2 is a diagram of an example network in which systems and/or methods described herein may be implemented.

FIG. 2 is a diagram of an example network 200 in which systems and/or methods described herein may be implemented. As shown in FIG. 2, network 200 may include user device 210, local server 220, digital video server (DVR) server 230, content server 240, database 250, network 260 and local network 270. The number of devices and/or networks, illustrated in FIG. 2, is provided for explanatory purposes only. In practice, there may be additional networks and/or devices, fewer networks and/or devices, different networks and/or devices, or differently arranged networks and/or devices than illustrated in FIG. 2.

Also, in some implementations, one or more of the devices of network 200 may perform one or more functions described as being performed by another one or more of the devices of network 200. For example, DVR server 230, content server 240, and/or database 250 may be integrated into a single device. In another example, local server 220 and local network 270 may be integrated into a single device. Components of network 200 may interconnect via wired connections, wireless connections, or a combination of wired and wireless connections.

User device 210 may include any computation or communication device, such as a wireless mobile device communication device that is capable of communicating with network 260 and/or local network 270. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a STB, a television, a camera, a personal gaming system, or another type of computation or communication device. In one implementation, user device 210 may receive or transmit images, may generate images using a camera associated with user device 210, and/or may store images in a memory associated with user device 210. In another implementation, user device 210 may host an image diary application and may use the image diary application to perform a setup operation, a registration operation, and/or image backup operations.

User device 210 may perform a setup operation that enables images, stored in user device 210, to be backed up in a manner specified by a user of user device 210. For example, user device 210 may display a setup UI via which image backup and/or display settings may be received from the user. The image backup and/or display settings may be stored in user device 210, which may be used by the image diary application to determine whether and/or the manner in which an image backup operation is to be performed. User device 210 may send a registration request to DVR server 230. The request may include, for example, information describing image backup and/or display settings and/or information associated with user device 210 (e.g., a user device 210 identifier, an email address, a username, a password, PIN, etc.). User device 210 may perform image backup operations by uploading images to local server 220, DVR server 230, and/or content server 240. In one example, user device 210 may act as a wireless router (e.g., a wifi router) and may backup images directly to local server 220 using a connection established via a private network (e.g., local network 270). In another example, user device 210 may backup images to content server 240 via a public network (e.g., network 260).

User device 210 may also perform synchronization operations by communicating with local server 220, DVR server 230, and/or content server 240, to determine which image files, stored on user device 210, have previously been backed up and which image files have not yet been backed up. User device 210 may, based on the synchronization operation, perform a backup operation on the images that have not yet been backed up. If during the synchronization operation, user device 210 determines that local server 220, DVR server 230 and/or content server 240 contain image files that are not stored on user device 210, then user device 210 may instruct local server 220, DVR server 230, and/or content server 240 to send the images files to user device 210 and/or to delete the images files.

User device 210 may interact with local server 220 in order to download images that are backed up on content server 240. In one example, user device 210 may instruct local server 220, which may be a STB, to download images, from content server 240, for display on a video display device to which the STB is connected. User device 210 may also permit a user to associate text with images displayed on user device 210 and/ or the video display device. The associated text may include timestamps, tags, descriptions, captions, etc. that may include a date or time associated with an image, names associated people displayed in an image, a caption and/or description that the user generates to describe an image, etc. In another example, user device 210 may instruct local server 220 to retrieve images for display from another local server via a private network (e.g., local network 270). In this example, local server 220 may be a STB and the other local server 220 may be a computer device.

The description to follow will generally refer to user device 210 as a wireless mobile communication device. The description is not limited, however, to a wireless mobile communication device and may equally apply to other types of user devices.

Local server 220 may include one or more server devices, or other types of computation or communication devices, that gather, process, search, store, and/or provide information in a manner similar to that described herein. For example, local server 220 may include a computer device (e.g., a personal computer associated with a user of user device 210), a STB, a video display device (e.g., a television and/or computer monitor) and/or a server device. Local server 220 may communicate via network 260 and/or local network 270.

Local server 220 may perform registration operations and/ or image backup operations. For example, local server 220 may send a registration request to DVR server 230 in response to an instruction from user device 210. The request may include information associated with user device 210 (e.g., a user device 210 identifier, an email address, a username, a password, PIN, etc.) and/or information associated with local server 220 (e.g., an identifier associated with local server 220, such as a STB identifier, etc.). Local server 220 may send periodic status notifications (e.g., every, 5 minutes, 1 minute, 30 seconds, etc.) to user device 210, DVR server 230, and/or content server 240 to indicate whether a connection can be established with local server 220 and/or to indicate that local server 220 is able to perform image backup operations.

Local server 220 may perform local image backup operations. For example, local server 220 may communicate with user device 210 and may receive images, from user device 210, for storage in a memory associated with local server 220. Local server 220 may perform other local image backup operations by communicating with content server 240 to retrieve (e.g., by downloading) images, associated with user device 210. Local server 220 may also perform synchronization operations by communicating with user device 210 to determine which image files, stored on user device 210, have previously been backed up and which images files have not yet been backed up. Local server 220 may receive image files, from user device 210, that have not yet been backed up and/or may send or delete images files stored on local server 220 that are not stored on user device 210 in response to an instruction from user device 210. Local server 220 may also perform synchronization operations by communicating with user content server 240 in the manner described above.

Local server 220 may perform an image display operation in response to a request from user device 210. For example, local server 220 may receive an instruction from user device 210 to download images from content server 240 for display on a video display device associated with local server 220. In this example, local server 220 may retrieve the images from content server 240 and may, for example, display the images in response to the request from user device 210. Additionally, or alternatively, local server 220 may receive instructions from user device 210 to display particular images (e.g., to perform slide shows, to play a video file, to display a single image, and/or to display a collection of images). In another example, local server 220 may receive an instruction from user device 210 to retrieve images from another local server 220 and may retrieve the images from the other local server.

DVR server 230 may include one or more server devices, or other types of computation or communication devices, that gather, process, search, store, and/or provide information.

DVR server 230 may interface with network 260 and/or local network 270. In one example implementation, DVR server 230 may store (e.g., record) television content, playback television content, and/or permit access to a guide that includes a listing of stored and/or other television content in response to a request/instructions received from a local server 220 (e.g., a STB). In another example implementation, DVR server 230 may perform registration operations. For example, DVR server 230 may receive a registration request from user device 210 and/or local server 220. DVR server 230 may monitor the status of user device 210, local server 220, and/or content server 240 and may send status notifications associated with local server 220 and/or content server 240, to user device 210.

DVR server 230 may perform remote image backup operations. For example, DVR server 230 may receive a request to backup images on content server 240 and DVR server 230 may authenticate user device 210 in response to the request. DVR server 230 may verify that content server 240 is online and/or is able to receive images and may send a notification to content server 240 indicating that images are authorized to be uploaded from user device 210. In another example, DVR server 230 may send a notification to user device 210 indicating the images may be uploaded to content server 240 based on an address included in the notification.

In another example implementation, DVR server 230 may receive images and may temporarily store the images in a memory associated with DVR server 230. DVR server 230 may receive status notifications from content server 240 and may send notifications to content server 240 that images are available to be downloaded and may send images, from temporary storage, to be backed up on content server 240.

Content server 240 may include one or more server devices, or other types of computation or communication devices, that gather, process, search, store, and/or provide information. Content server 240 may interface with network 260 and/or local network 270. In one example implementation, content server 240 may perform remote image backup operations. For example, content server 240 may send periodic status notifications (e.g., every 10 minutes, 5 minutes, 1 minute, etc.) to DVR server 230 and/or local server 220 to indicate that content server 240 is online, is available, and/or is otherwise operational. Content server 240 may perform remote image backup operations by communicating with user device 210 and may receive images, from user device 210, for storage in a memory associated with content server 240 (e.g., database 250). Content server 240 may also perform synchronization operations by communicating with user device 210 and/or local server 220 to determine which image files, stored on user device 210 and/or local server 220, have previously been backed up and which image files have not yet been backed up. Based on the synchronization operation, content server 240 may receive image files, from user device 210 and/or local server 220, that have not been previously backed up. In another example implementation, content server 240 may perform remote image backup operations by communicating with DVR server 230 to retrieve (e.g., by downloading) images, associated with user device 210, which may be temporarily stored (e.g., cached) in a memory associated with DVR server 230.

In another example implementation, content server 240 may send images, received from user device 210, to local server 220 based on an instruction from user device 210 and/or an authorization from DVR server 230.

Database 250 may include a device to write, read and/or store information. Database 250 may interface with content server 240 and may store images associated with remote backup operations. For example, database 250 may receive images, associated with user device 210, from content server 240 and may store the images.

Network 260 may include a public network, such as a wide area network (WAN), a metropolitan area network (MAN), a telephone network (e.g., the Public Switched Telephone Network (PSTN), or a cellular network, such as the Public Land Mobile Network (PLMN), and/or a second generation (2G) network, a third generation (3G) network, and/or a fourth generation (4G) network), an ad hoc network, an intranet, the Internet, a fiber optic-based network (e.g., a fiber optic service (FiOS) network), or a combination of networks. Additionally, or alternatively, network 260 may include a broadband network, a service provider network and/or a carrier network.

Local network 270 may include a private network, such as a local area network (LAN), an ad hoc network, and/or an intranet. Local network 270 may include a wired LAN and/or a wireless LAN (e.g., a Wi-Fi network). Local network 270 may not generally be accessible to the public (e.g., a private residential/home network, an office network, and/or a network, associated with some other entity, that is not generally accessible to the public).

Although not shown in FIG. 2, network 200 may include a variety of other devices, such as an authentication server, a self-provisioning server, etc. Each of these devices may perform certain functions described briefly below. Any of these functions may be performed by local server 220, DVR server 230 and/or content server 240. Thus, one or more of these devices may be integrated into local server 220, DVR server 230, and/or content server 240.

The authentication server may include one or more server devices, or other types of computation or communication devices, that authenticates user device 210 and/or local server 220 (e.g., a STB performing an image download operation). For example, the authentication server may receive a request to authenticate user device 210 based on information associated with local server 220 (e.g., an identifier associated with local server 220), information associated with a user of user device 210 (e.g., username, password, email address, PIN, etc.), and/or information associated with user device 210 (e.g., an identifier associated with user device 210).

The self-provisioning server may include one or more server devices, or other types of computation or communication devices that enables the registration of user device 210. The self-provisioning server may receive registration information from user device 210 and/or local server 220. The self-provisioning server may facilitate sending address information, associated with local server 220 and/or content server 240, to user device 210 and/or may forward backup preferences, associated with a user of user device 210, to DVR server 230.

Figure 3:
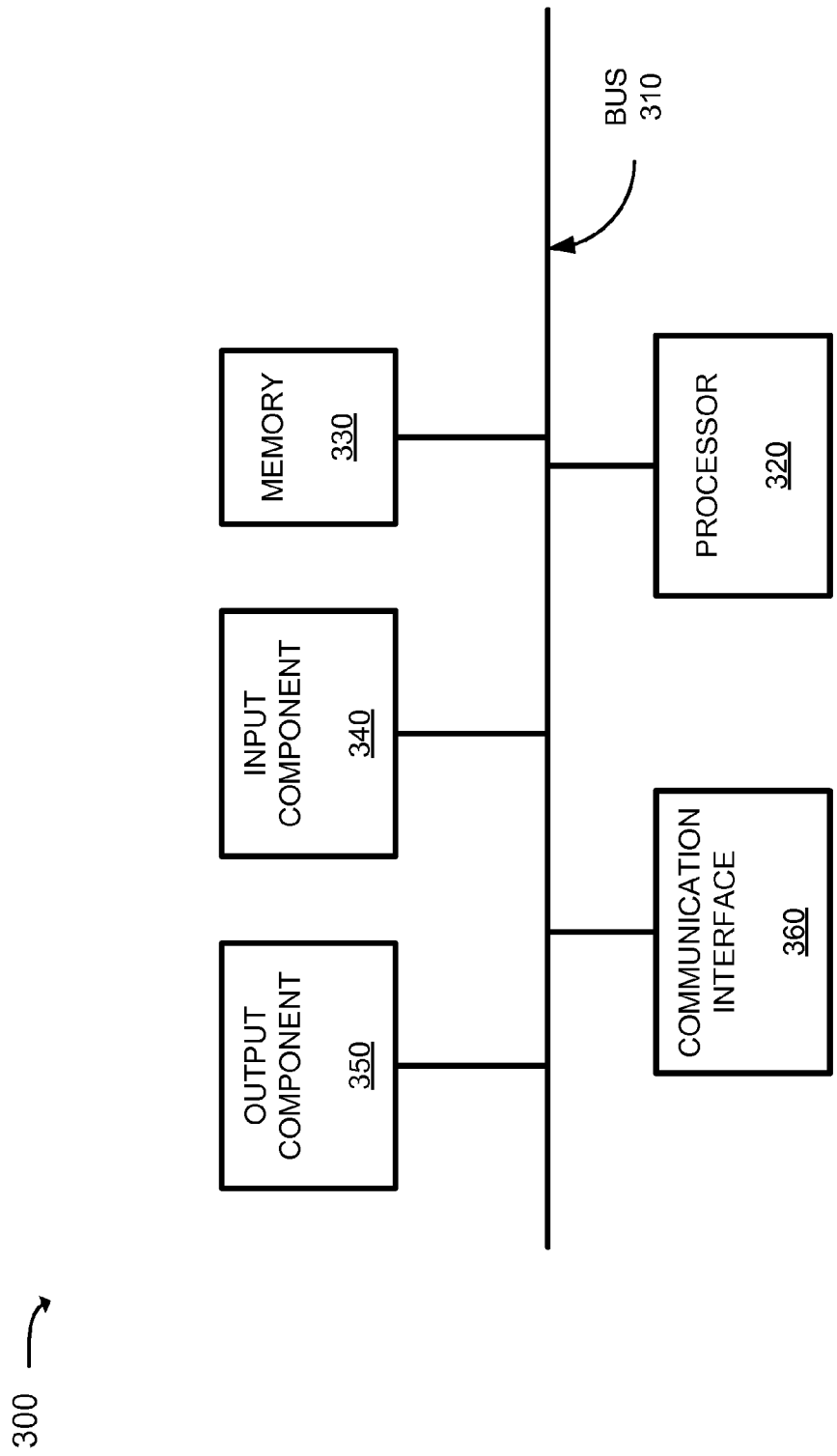
FIG. 3 is a diagram of example components of one or more of the devices of FIG. 2.

FIG. 3 is a diagram of example components of a device 300 that may correspond to local server 220, DVR server 230, and/or content server 240. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. Additionally, or alternatively, in other implementations, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 360 may include mechanisms for communicating with another device or system via a network, such as network 260 and/or local network 270.

As will be described in detail below, device 300 may perform certain operations relating to image display and automatic mobile image diary backup. Device 300 may perform these operations in response to processor 320 executing software instructions contained in a computer-readable medium, such as memory 330. A computer-readable medium may be defined as a physical or logical memory device. A logical memory device may include memory space within a single physical memory device or spread across multiple physical memory devices. The software instructions may be read into memory 330 from another computer-readable medium or from another device. The software instructions contained in memory 330 may cause to processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
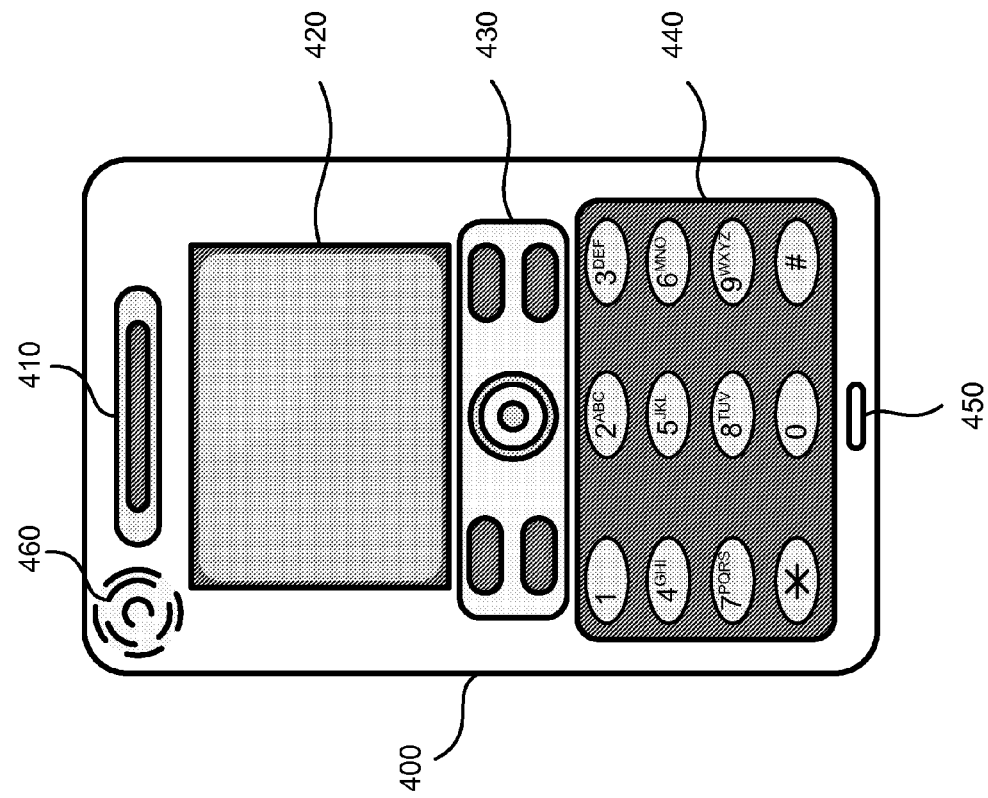
FIG. 4 is a diagram of an example user device, as shown in FIG. 2.

FIG. 4 is a diagram of an example user device 210. As shown in FIG. 4, user device 210 may include a housing 400, a speaker 410, a display 420, control buttons 430, a keypad 440, a microphone 450, and/or a camera 460. Housing 400 may include a chassis on which some or all of the components of user device 210 are mechanically secured and/or covered. Speaker 410 may include a component to receive input electrical signals from user device 210 and transmit audio output signals, which communicate audible information to a user of user device 210.

Although FIG. 4 depicts example components of user device 210, in other implementations, user device 210 may contain fewer components, additional components, different components, or differently arranged components than illustrated in FIG. 4. In still other implementations, one or more components of user device 210 may perform one or more tasks described as being performed by one or more other components of user device 210.

Display 420 may include a component to receive input electrical signals and present a visual output in the form of text, images, videos and/or combinations of text, images, and/or videos which communicate visual information to the user of user device 210. In one implementation, display 420 may display text input into user device 210, text, images, and/or video received from another device, and/or information regarding incoming or outgoing calls or text messages, emails, media, games, phone books, address books, the current time, etc.

Control buttons 430 may include one or more buttons that accept, as input, mechanical pressure from the user (e.g., the user presses a control button or combinations of control buttons) and may send electrical signals to processing unit 320 that may cause user device 210 to perform one or more operations. For example, control buttons 430 may be used to cause user device 210 to transmit information. Keypad 440 may include a standard telephone keypad or another arrangement of keys.

Microphone 450 may include a component to receive audible information from the user and send, as output, an electrical signal that may be stored by user device 210, transmitted to another user device, or cause the device to perform one or more operations. Camera 460 may be provided on a back side of user device 210, and may include a component to receive, as input, analog optical signals and send, as output, a digital image or video that can be, for example, viewed on the display 410, stored in the memory of user device 210, discarded and/or transmitted to another user device 210.

Figure 5:
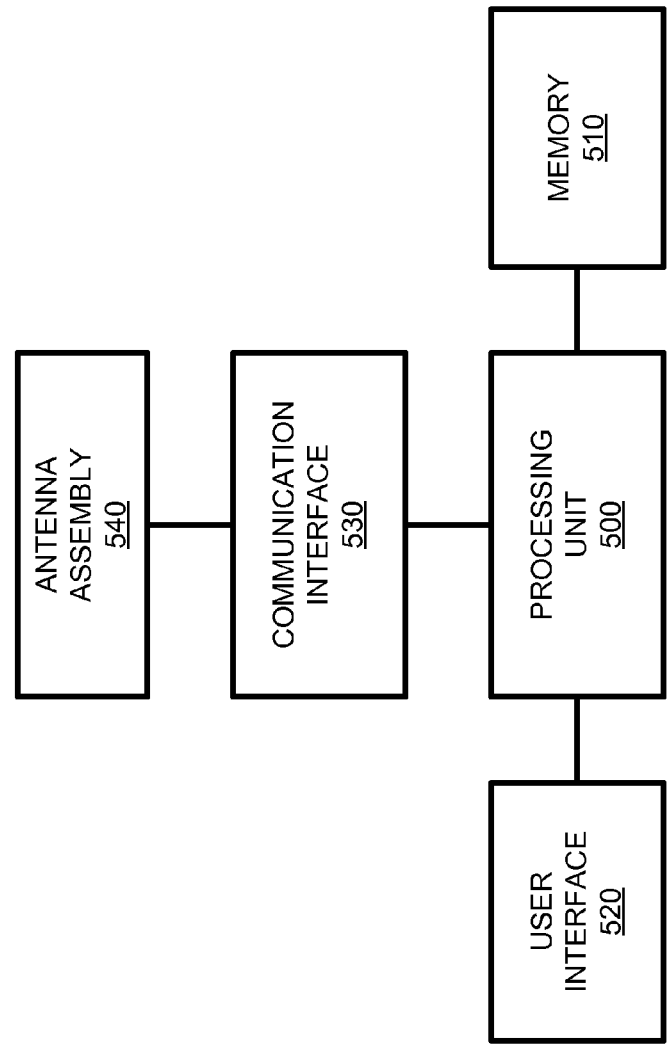
FIG. 5 is a diagram of example components of the user device of FIG. 4.

FIG. 5 is a diagram of example components of user device 210. As shown in FIG. 5, user device 210 may include a processing unit 500, a memory 510, a user interface 520, a communication interface 530, and/or an antenna assembly 540. Although FIG. 5 shows example components of user device 210, in other implementations, user device 210 may contain fewer components, additional components, different components, or differently arranged components than depicted in FIG. 5. In still other implementations, one or more components of user device 210 may perform one or more tasks described as being performed by one or more other components of user device 210.

Processing unit 500 may include a processor, a microprocessor, an ASIC, a FPGA, or the like. Processing unit 500 may control operation of user device 210 and its components. In one implementation, processing unit 500 may control operation of components of user device 210 in a manner similar to that described herein. Memory 510 may include a RAM, a ROM, and/or another type of memory to store data and/or instructions that may be used by processing unit 500.

User interface 520 may include mechanisms for inputting information to user device 210 and/or for outputting information from user device 210. Examples of input and output mechanisms might include buttons (e.g., control buttons 430, keys of keypad 440 or a keyboard, a joystick, etc.); a touch screen interface to permit data and control commands to be input into user device 210; a biometric device to receive fingerprints scans, retina scans, facial signatures, etc.; a speaker (e.g., speaker 410) to receive electrical signals and output audio signals; a microphone (e.g., microphone 450) to receive audio signals and output electrical signals; a display (e.g., display 420) to output visual information (e.g., an image backup and/or display settings UI, web pages, etc.); a vibrator to cause user device 210 to vibrate; and/or a camera (e.g., camera 460) to receive video and/or images.

Communication interface 530 may include, for example, a transmitter that may convert baseband signals from processing unit 500 to radio frequency (RF) signals and/or a receiver that may convert RF signals to baseband signals. Alternatively, communication interface 530 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 530 may connect to antenna assembly 540 for transmission and/or reception of the RF signals.

Antenna assembly 540 may include one or more antennas to transmit and/or receive RF signals over the air. Antenna assembly 540 may, for example, receive RF signals from communication interface 530 and transmit them over the air, and receive RF signals over the air and provide them to communication interface 530. In one implementation, for example, communication interface 530 may communicate with a network and/or devices connected to a network (e.g., network 260 and/or local network 270).

As described in detail below, user device 210 may perform certain operations described herein in response to processing unit 500 executing software instructions of an application contained in a computer-readable medium, such as memory 510. The software instructions may be read into memory 510 from another computer-readable medium or from another device via communication interface 530. The software instructions contained in memory 510 may cause processing unit 500 to perform processes that will be described later. Alternatively, hardwired circuitry may be used in place of or in combination with software instructions to implement processes described herein. Thus, implementations described herein are not limited to any specific combination of hardware circuitry and software.

Figure 6:
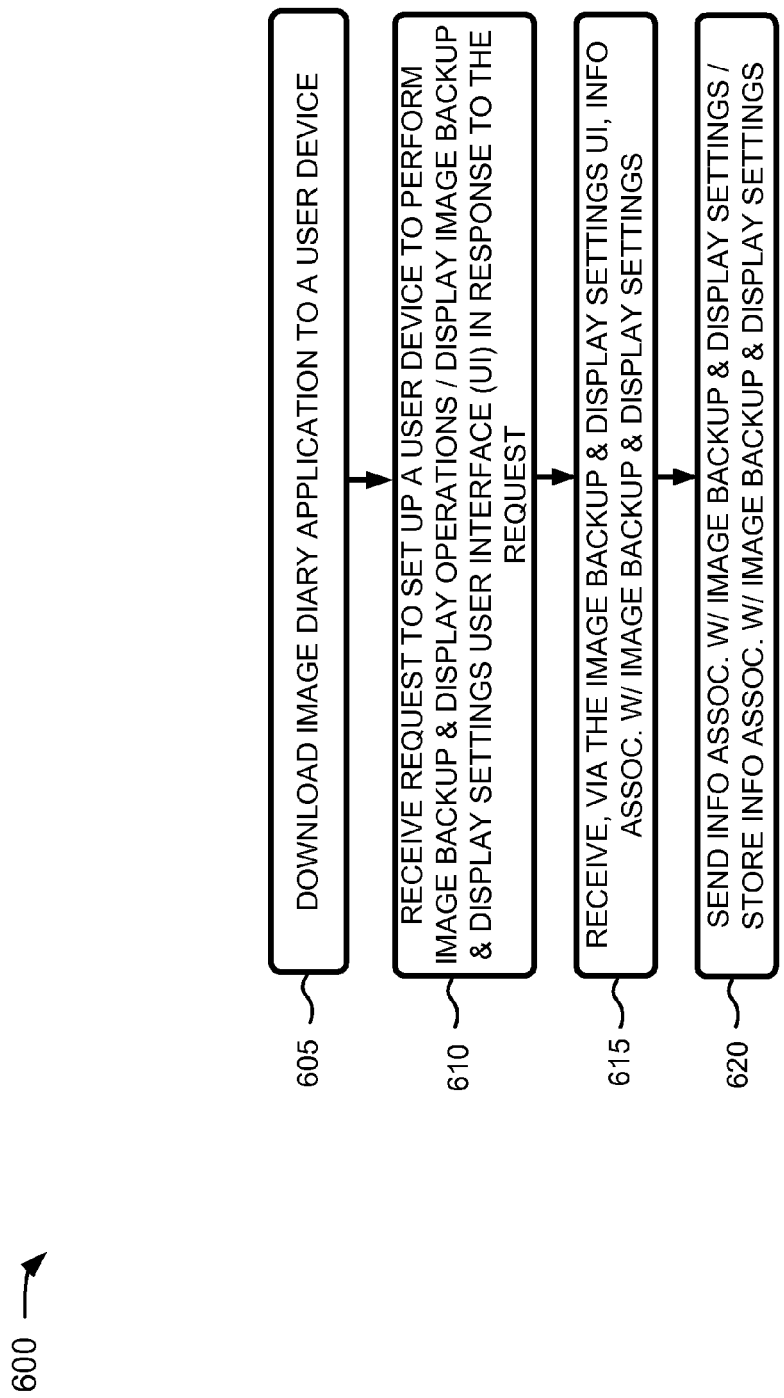
FIG. 6 is a flowchart of an example process for setting up a user device to perform automatic mobile image diary backup and display operations.
Figure 7:
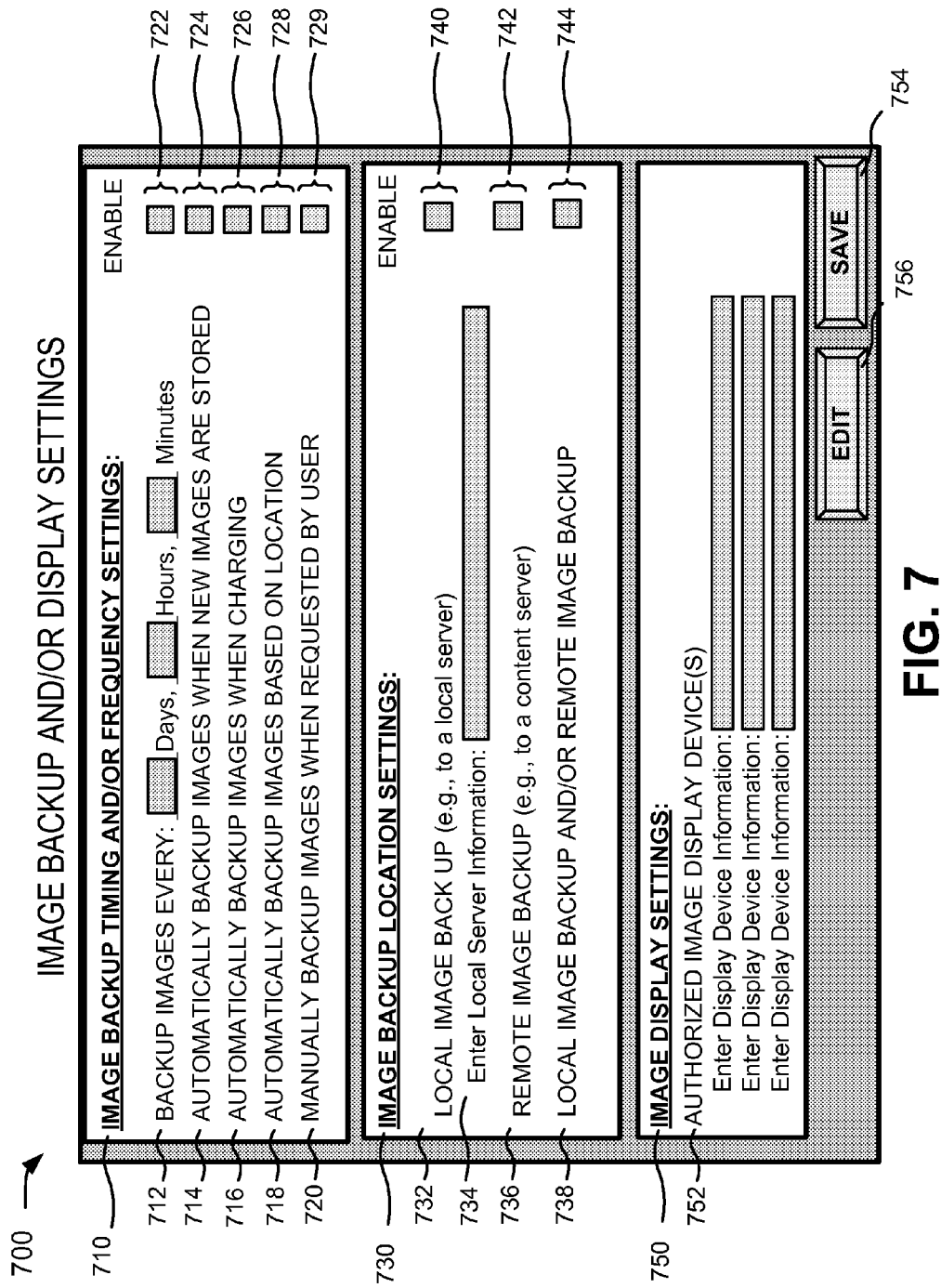
FIG. 7 is a diagram of an example image diary backup and/or display settings user interface that is capable of being presented on the user device of FIG. 2.

FIG. 6 is a flowchart of an example process 600 for setting up user device 210 to perform image backup and/or display operations. In one implementation, process 600 may be performed by user device 210. In another implementation, some or all of process 600 may be performed by a device or collection of devices separate from, or in combination with, user device 210. FIG. 7 is a diagram of an example image backup and/or display settings user interface (UI) 700 (hereinafter referred to as "settings UI 700) that is capable of being presented on the user device of FIG. 2. A portion of process 600, of FIG. 6, will be discussed below with corresponding references to settings UI 700 shown in FIG. 7.

As shown in FIG. 6, process 600 may include downloading an image diary application to user device 210 (block 605). For example a user of user device 210 may desire to backup images received and/or stored on user device 210 and may send a request to DVR server 230 to download an image diary application. DVR server 230 may receive the request and may transmit the image diary application to user device 210. User device 210 may receive the image diary application and may configure the image diary application by providing information associated with the user (e.g., username, password, PIN, etc.), which the image diary application may use, at a future point in time, to verify the user.

As also shown in FIG. 6, process 600 may include receiving a request to setup user device 210 to perform image backup and/or display operations (block 610). Block 610 may also include displaying an image backup and/or display settings UI in response to the request (block 610). For example, the user may desire to setup user device 210 to perform image backup and/or display operations using the image diary application and the user may request (e.g., by pressing a particular button, or combination of buttons, on user device 210) the image diary application to present an image backup and/or display settings UI for display on user device 210. The image diary application may receive the request and may present an image backup and/or display settings UI for display on user device 210. In one example implementation, image backup and/or display settings UI may correspond to settings UI 700 of FIG. 7. In another example implementation, the image diary application may automatically display the image backup and/or display settings UI in response to installation of the image diary application.

As illustrated in FIG. 7, settings UI 700 may include, for example, image backup timing settings 710, image backup location settings 730, and/or image display settings 750. Image backup timing settings may include a setting, setting 710, to backup images (e.g., stored on user device 210) based on a user-specified time period 712 (e.g., every xx days, yy hours, zz minutes, etc.); a setting, setting 714, to automatically backup images when new images are stored on user device 210; a setting, setting 716, to automatically backup images when the user charges user device 210 (e.g., when the user connects user device 210 to a power supply); a setting, setting 718, to automatically backup images based on location (e.g., when user device 210 is at a particular location, such as at the office, at a residence, etc.); and/or a setting, setting 720, to manually backup images when requested by the user (e.g., when the user presses a button, or combination of buttons, on user device 210). Additionally, or alternatively, the setting, setting 720, to manually backup images when requested by the user could be performed in combination with the setting to automatically backup images based on the user-specified time period 712, the setting, setting 714, to automatically backup images when new images are stored, and/or the setting, setting 718, to backup images based on location.

Image backup location settings 730 may include, for example, a setting to perform a local image backup 732 (e.g., by storing images on local server 220) that includes a local server information setting 734 that permits the user to enter information (e.g., a device identifier) associated with a desired local server 220 in which images are to be stored. Image backup location settings 730 may also include a setting to perform a remote image backup 736 (e.g., by storing images on content server 240) and/or a setting to perform the local image backup and/or the remote image backup 738.

Image display settings 750 may include a setting to authorize image display devices 752 that may include an STB, a personal computer, etc. that are authorized to receive images from content server 240 for display on a video display device. The setting to authorize image display devices 752 may include fields that permit the user to enter information associated with authorized display device(s) (e.g., device identifiers such as an STB identifier, a computer identifier, etc.).

Settings UI 700, of FIG. 7, includes settings 710-720, 730-738, 750 and 752 for explanatory purposes. In practice, settings UI 700, of FIG. 7, may include additional settings, fewer settings, different settings, and/or differently arranged settings than are described with respect to data structure 700 of FIG. 7.

Returning to FIG. 6, process 600 may include receiving, via the settings UI, information associated with the image backup and/or display settings (block 615). For example, the user may enter information associated with image backup and/or display settings, via the settings UI (e.g., settings UI 700, of FIG. 7) and the information associated with image backup and/or display settings (hereinafter referred to as "image settings") may be received by user device 210.

For example, the user may specify that images are to be backed up based on a particular time interval by placing an "X" (e.g., "selecting") in box 722 and/or entering a particular time interval (e.g., xx days, yy hours, zz minutes, etc.) in the entries associated with setting to backup images based on a user-specified time period 712. The user may specify that an automatic image backup operations is to be performed when new images are stored (e.g., in a memory associated with user device 210) by selecting box 724. The user may enable automatic backup operations to be performed when the user device is in a particular state, such as when the user device is charging, by selecting box 726. The user may specify that an image backup operation is to be performed when user device 210 is at a particular location (e.g., at home, at the office, etc.). In this example, the user may specify a location by pressing a particular button, or series of buttons, on user device 210 when user device 210 is at a location at which the image backup operation is to be performed. In a further example, the user may enable image backup operations to be performed manually (e.g., when the user presses a button, or series of buttons on user device 210) by selecting box 729. If the user does not specify image backup timing and/or frequency settings 710, then the image diary application may, as a default, automatically backup the images when new images are stored to the user device 714.

The user may specify image backup location settings 730. For example, the user may specify that images are to be backed up to a local server (e.g., local server 220) via a home and/or local network (e.g., local network 270) by selecting box 740. In another example, the user may specify that images are to be backed up to a remote server (e.g., content server 240) via a public network, such as the Internet (e.g., network 260), by selecting box 742. In yet another example, the user may specify that images are to be backed up to either the local server and/or the remote server by selecting box 744. In this example, user device may identify if a network connection can be established with local server 220 and may upload images to local server 220 if the network connection can be established. If the network connection cannot be established, the images may, for example, be uploaded to content server 240. If the user does not specify image backup location settings 730, then the image diary application may select one of the information security preferences as a default.

Returning to FIG. 6, process 600 may include sending information associated with image backup and/or display settings and/or storing the information associated with the image backup and/or display settings (block 620). For example, when the user has completed specifying image settings, via the settings UI, the user may save the image settings (e.g., by selecting "save" button 754 on settings UI 700 of FIG. 7). The image diary application may, in response to the request to save the image settings, store information associated with the image settings in a memory associated with user device 210. The image diary application may also send the information associated with the image settings to DVR server 230 to be used when performing image backup operations associated with user device 210 and/or when retrieving images in response to a request, from local server 220 (e.g., a STB), to display the images on a video display device associated with local server 220. Additionally, or alternatively, the user may, at a later point in time, update image settings (e.g., by selecting "edit" button 756 on settings UI 700), which may permit the user to make changes to the information associated with the image settings.

Figure 8:
FIG. 8 is a flowchart of an example process for registering a local server with a digital video recorder (DVR) server within the network of FIG. 2.

FIG. 8 is a flowchart of an example process 800 for registering local server 220 with DVR server 230. In one implementation, process 800 may be performed by local server 220 and DVR server 230. In another implementation, some or all of process 800 may be performed by a device or collection of devices separate from, or in combination with, local server 220 and DVR server 230.

As shown in FIG. 8, process 800 may include receiving a registration request (block 802). For example, local server 220 may send a registration request to DVR server 230 and DVR server 230 may receive the registration request. The registration request may include information associated with a user of user device 210 (e.g., username, password, PIN, email address, etc.), information associated with user device 210 (e.g., a device identifier, such as an MDN, etc.) information associated with local server 220 (e.g., a device identifier, a network address associated with local server 220, etc.). In one example implementation, local server 220 may be a STB in which the device identifier may be a STB identifier.

As also shown in FIG. 8, process 800 may include verifying local server 220 and storing information associated with the user, user device 210, and/or local server 220 (block 804). For example, DVR server 230 may receive the request and may retrieve information associated with image settings associated with the user and/or user device 210 from a memory associated with DVR server 230. DVR server 230 may compare the information associated with local server 220 received in the registration request to information associated with local server 220 on which images are to be backed up as specified by the user in the image settings retrieved from the memory. Based on a determination that the information associated with local server 220, received in the registration request, does not match the information associated with local server 220, specified by the user, DVR server 230 may not register local server 220.

If, however, DVR server 230 determines that the information associated with local server 220, received in the registration request, matches the information associated with local server 220, specified by the user, then DVR server 230 may register local server 220. DVR server 230 may, for example, store (e.g., in a memory associated with DVR server 230) the information associated with the user, user device 210, and local server 220 based on the determination that local server 220 is authorized by the user to perform image backup and/or display operations.

Periodic status notifications may be received (block 806). For example, DVR server 230 may receive periodic status notifications (e.g., every 5 minutes, 1 minute, 30 seconds, etc.) from local server 220 that may indicate that a connection to local server 220 can be established (e.g., that local server 220 is online, is available, and/or is otherwise able to perform image backup and/or display operations). The periodic status notifications may include information associated with the user, information associated with local server 220, and/or information associated with user device 210.

Figure 9:
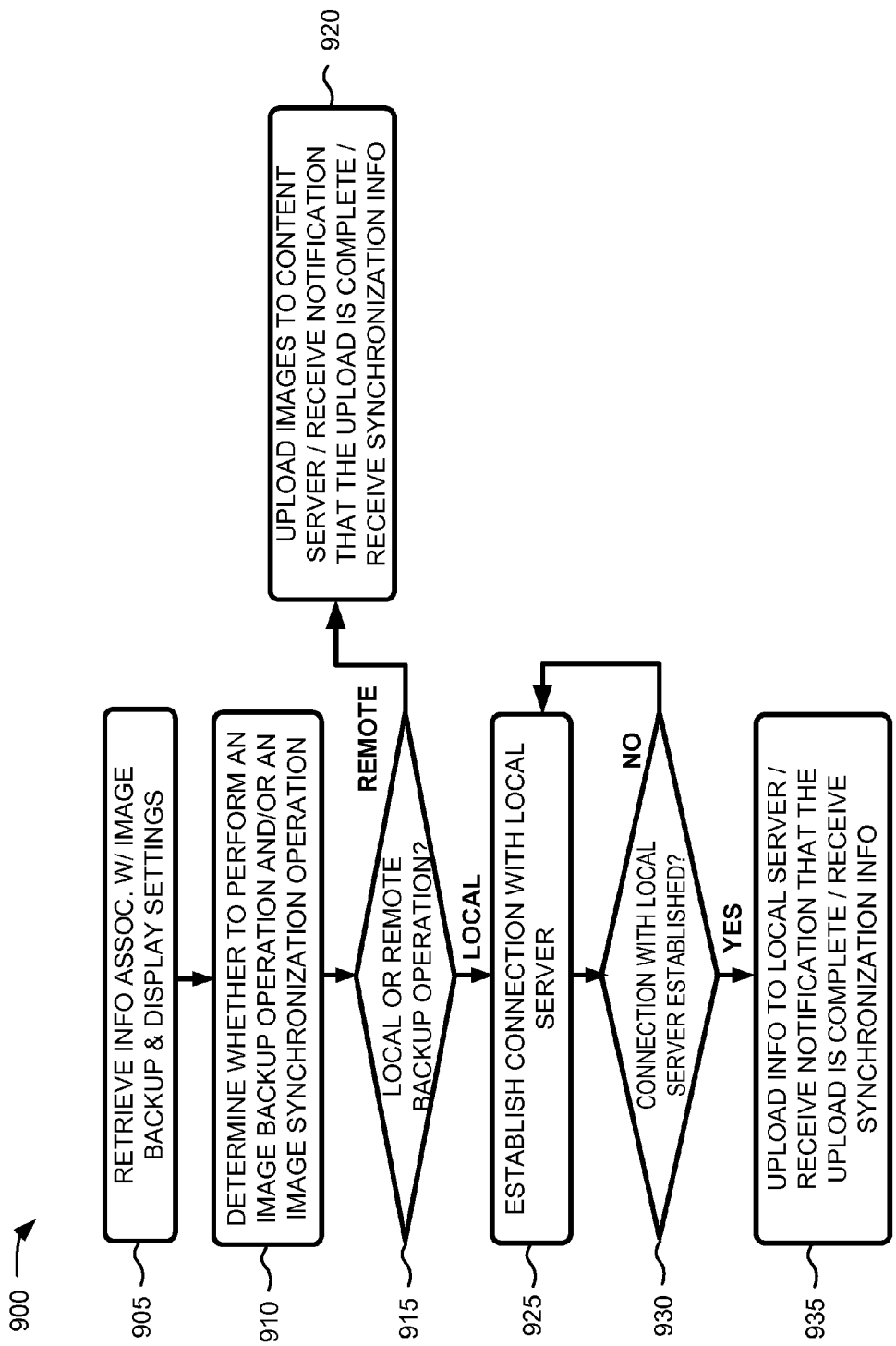
FIG. 9 is a flowchart of an example process for automatically backing up images from a user device within the network of FIG. 2.

FIG. 9 is a flowchart of an example process 900 for automatically backing up images from user device 210. In one implementation, process 900 may be performed by user device 210, local server 220, DVR server 230, and content server 240. In another implementation, some or all of process 900 may be performed by a device or collection of devices separate from, or in combination with, user device 210, local server 220, DVR server 230, and content server 240.

As shown in FIG. 9, process 900 may include retrieving information associated with image backup and/or display settings (block 905). Assume that local server 220 has registered with DVR server 230, in a manner similar to that described above with respect to process 800 of FIG. 8. Assume further that a user (e.g., a user of user device 210) has specified image settings in a manner similar to that described above with respect to process 600 of FIG. 6. The image diary application may retrieve information associated with the image settings (e.g., information associated with image settings received via settings UI 700 of FIG. 7) from a memory (e.g., a memory associated with user device 210) and may determine whether to perform an automatic backup operation based on the retrieved information associated with image settings.

As also shown in FIG. 9, process 900 may include determining whether to perform an image backup operation and/or an image synchronization operation (block 910). For example, the image diary application may determine that an automatic image backup operation is to be performed based on a particular time interval as specified by the user (e.g., every two hours, every day, every ninety minutes, etc.). In this example, the diary application may determine, based on the particular time interval, that an image backup operation is to be performed when a period of time since the previous image backup operation is greater than the particular time interval specified by the user in the image settings.

In another example, the image diary application may determine that the user has specified that the image backup operation is to be performed when new images have been stored. The diary application may, for example, determine whether new images have been stored during the period of time since the previous image backup operation and may perform the image backup operation if new images have been stored. In this example, user device 210 may store new images in a memory (e.g., associated with user device 210) and may add an image file identifier (e.g., a file name, file number, and/or some other identifier), associated with the new information, to an upload list. The image diary application may perform an automatic image backup operation based on the file identifier stored in the upload list.

In yet another example, the image diary application may perform an image synchronization operation. The image diary application may, for example, communicate with local server 220, DVR server 230, and/or content server 240 to determine whether any image files, stored on user device 210, have not been backed up to local server 220, DVR server 230, and/or content server 240. The image diary application may determine that files, stored on user device 210 have not been backed up to local server 220, DVR server 230 and/or content server 240 and an automatic image backup operation may be triggered by the image diary application.

In still another example, the image diary application may perform an image backup operation based on a location associated with user device 210. For example, the image diary application may determine that the user device 210 is at a location (e.g., a home, an office, etc.) at which the user specified (e.g., in the image settings) an image backup operation is to be performed. The image diary application may, for example, perform the image backup operation based on the determination that user device is located at the specified location. In a further example, the user may press a particular button, or combination of buttons, on user device 210, to perform a manual image backup operation.

In a further example, user device 210 may perform an image backup operation based on user habits. For example, the image diary application may determine that the user manually triggers an image backup operation during a particular time period in which the quantity of manually-triggered backup operations exceeds a threshold. Based on the determination that the quantity of times that the manually-triggered image backup operations is greater than the threshold, the image diary application may automatically perform an image backup operation during the particular period of time.

In another example implementation, the image diary application may determine that an image backup operation is to be performed, as described above, and the image diary application may wake up user device 210 (e.g., if user device 210 is in a standby mode) and/or power up user device 210 (e.g., if user device 210 is powered off) in order to perform the image backup operation. In one example, the image diary application may wake up and/or power up user device 210 to establish a connection with local server 220 (e.g., to perform a local image backup operation) via a home network and/or local network (e.g., local network 270). In another example, the image diary connection may wake up and/or power up user device 210 to communicate with DVR server 230 and/or content server 240 (e.g., to perform a remote image backup operation) via a public network (e.g., network 260).

As shown in FIG. 9, if the backup operation is a remote image backup operation (block 915—REMOTE), then process 900 may include uploading images to content server 240, receiving a notification that the upload is complete, and/or receiving synchronization information (block 920). For example, the image diary application may determine that the user has specified that images are to be backed up remotely based on the image backup location settings 730 of FIG. 7. The image diary application may, based on the determination, send a notification, to DVR server 230 and via a public network (e.g., network 260), indicating that an image backup operation is to be performed. DVR server 230 may receive the notification and may authenticate user device 210 based on a determination that information associated with user device 210, contained in the notification, matches information associated with user device 210 stored in a memory associated with DVR server 230 (e.g., based on information associated with the image settings). DVR server 230 may, based on the authentication of user device 210, send an indication to content server 240 and/or user device 210 that an image backup operation with user device 210 is authorized. In one example, the notification sent to user device 210 may include a network address, associated with content server 240, where images are to be sent to be backed up. In another example, the notification sent to content server 240 may include a network address associated local server 220.

User device 210 may receive the indication and the image diary application may, for example, send a notification to content server 240 that includes a list of image file identifiers associated with images stored by user device 210. Content server 240 may receive the notification and may compare the list of image file identifiers to another list of image file identifiers stored in a memory (e.g., database 250). Content server 240 may determine whether particular image file identifiers, from the list of image file identifiers, match any of the image file identifiers from the other list of image file identifiers stored in database 250. Content server 240 may send, to user device 210 and via the public network (e.g., network 260), an upload list that includes the particular image file identifiers that do not match any of the image file identifiers from the other list of image file identifiers stored in database 250 (e.g., that correspond to images that have not yet been backed up).

User device 210 may send images to content server 240. For example, user device 210 may send images, that correspond to the particular file identifiers included on the upload list, to content server 240, via the public network, in response to the upload list received from content server 240. Content server 240 may receive the images and may send another notification to user device 210 when the images have been received. Content server 240 may store the received images in database 250 and may remove image file indicators, associated with the received images, from the upload list.

In another example, user device 210 may retrieve timestamp information associated with a particular time at which the most recent backup operation was performed by user device 210. Based on the timestamp information, user device 210 may retrieve images stored by user device 210 after the particular time and may send the retrieved images to content server 240. In yet another example, user device 210 may index and/or store pending images (e.g., images that are not yet backed up) to a memory and may upload the pending images based on the index during another backup operation (e.g., at a future point in time).

Content server 240 may perform a synchronization operation with user device 210. For example, content server 240 may send, to user device 210, a notification indicating that the upload operation is complete, which may include synchronization information. The synchronization information may include particular image file identifiers that correspond to some or all of the images stored in the memory. User device 210 may receive the particular image file identifiers and may, for example, synchronize the images stored on user device 210 by removing the particular image file identifiers from the upload list and/or marking the particular image file identifiers as having been backed up and/or uploaded.

Content server 240 may perform another synchronization operation with local server 220. For example, content server 240 may send a notification to local server 220 indicating that new images have been stored on content server 240. The notification may include a list of image file indicators stored in database 250. Local server 220 may receive the notification and may determine which image images, if any, have not already been backed up. Based on the determination, local server 220 may send an upload list of image file indicators that correspond to images that have not yet been stored in the memory associated with local server 220. Content server 240 may receive the upload list and may send the images that correspond to the image file indicators on the upload list, to local server 220. Local server 220 may receive the images and may store the images in a memory associated with local server 220.

As shown in FIG. 9, if the backup operation is a local backup operation (block 915—LOCAL), then process 900 may include establishing a connection with local server 220 (block 925). For example, user device 210 may, from the information associated with the image settings, determine that the user has specified that images are to be backed up locally (e.g., on local server 220). User device 210 may determine whether a private network, associated with local server 220 (e.g., local network 270), is available. For example, the image diary application may cause user device 210 to transmit a hello notification (e.g., a ping and/or hello message) to determine whether local network 270 is available. In another example, image diary application may cause user device 210 to act like a wireless router that permits a notification to be sent to local server 220, via local network 270 (e.g., if available), that a local image backup operation is to be performed. In another example implementation, user device 210 may send a notification, to DVR server 230 via a public network (e.g., network 260) to determine whether local server 220 is online, available, and/or otherwise operational. DVR server 230 may receive the notification and may check to determine whether local server 220 is online, is available, and/or is otherwise operational by checking whether status notifications are being received from local server 220).

As further shown in FIG. 9, if a connection with local server 220 cannot be established (block 930—NO), then process 900 may include re-establishing the connection with local server 220 (block 925). For example, user device 210 may not receive a return hello notification (e.g., a return ping and/or another return message) from local network 270 and may determine that local network 270 is not available. In another example, user device 210 may not receive a response to the notification that a local image backup operation is to be performed. In another example implementation, DVR server 230 may determine that status notifications are not being received from local server 220 and may send a notification to user device 210 indicating that local server 220 is offline and/or is not available. Based on the determination, the image diary application may not perform the local image backup operation and may continue to attempt to establish the connection with local server 220 in a manner similar to that described above (e.g., with respect to block 925).

In another example implementation, user device 210 may perform a temporary image backup operation to content server 240 or DVR server 230. In this example, user device 210 may upload images to content server 240 and/or DVR server 230 to be temporarily stored until the connection with local server device 210 can be reestablished.

As yet further shown in FIG. 9, if a connection with local server 220 can be established (block 930—YES), then process 900 may include uploading images to local server 220, receiving a notification that the upload is complete, and receiving synchronization information (block 935). For example, user device 210 may receive a return hello notification (e.g., a return ping and/or another return message) from local network 270 and may determine that local network 270 is available. In another example, user device 210 may receive a response to the notification that a local image backup operation is to be performed. In another example implementation, DVR server 230 may determine that status notifications are being received from local server 220 and may send a notification to user device 210 indicating that local server 220 is online and/or is available.

For example, local server 220 may receive the notification that the local image backup operation is to be performed (that included a list of image file identifiers associated with images stored on user device 210) and may send, in response to the notification, an upload list to user device 210 via the private network. The upload list may contain particular image file identifiers that do not match any of the image file identifiers stored in local server 220 memory. The image diary application may cause user device 210 to send images, corresponding to the particular image file identifiers, to local server 220 via the private network and local server 220 may send a notification to user device 210 when the upload is complete. Local server 220 may store the images in a memory (e.g., a memory associated with local server 220).

In another example and in a manner similar to that described above (with respect to block 920), user device 210 may retrieve timestamp information associated with a particular time at which the previous backup operation was performed by user device 210. Based on the timestamp information, user device 210 may retrieve images stored by user device 210 after the particular time and may send the retrieved images to local server 220 via a private network (e.g., local network 270). Local server 220 may store the images in a memory (e.g., a memory associated with local server 220).

Local server 220 may perform a synchronization operation. For example, local server 220 may send, to user device 210, a notification indicating that the upload operation is complete, which may include synchronization information. The synchronization information may include particular image file identifiers that correspond to some or all of the images stored in the memory. User device 210 may receive the particular file identifiers and may synchronize the images stored on user device 210 by removing the particular image file identifiers from the upload list and/or marking the particular image file identifiers as having been backed up and/or having been uploaded.

Local server 220 may perform another synchronization operation with content server 240. For example, local server 220 may send a notification to content server 240 indicating that new images have been stored on local server 220. In one example, local server 220 may communicated with DVR server 230 to be authenticated and based on the authentication, DVR server 230 may send, to local server 220, a network address associated with content server 240. The notification may include a list of image file indicators stored in a memory associated with local server 220. Content server 240 may receive the notification and may determine which image, if any, have not already been backed up. Based on the determination, content server 240 may send an upload list of image file indicators that correspond to images that have not yet been stored in database 250. Local server 220 may receive the upload list and may send the images that correspond to the image file indicators on the upload list, to content server 240. Content server 240 may receive the images and may store the images in database 250.

Figure 10:
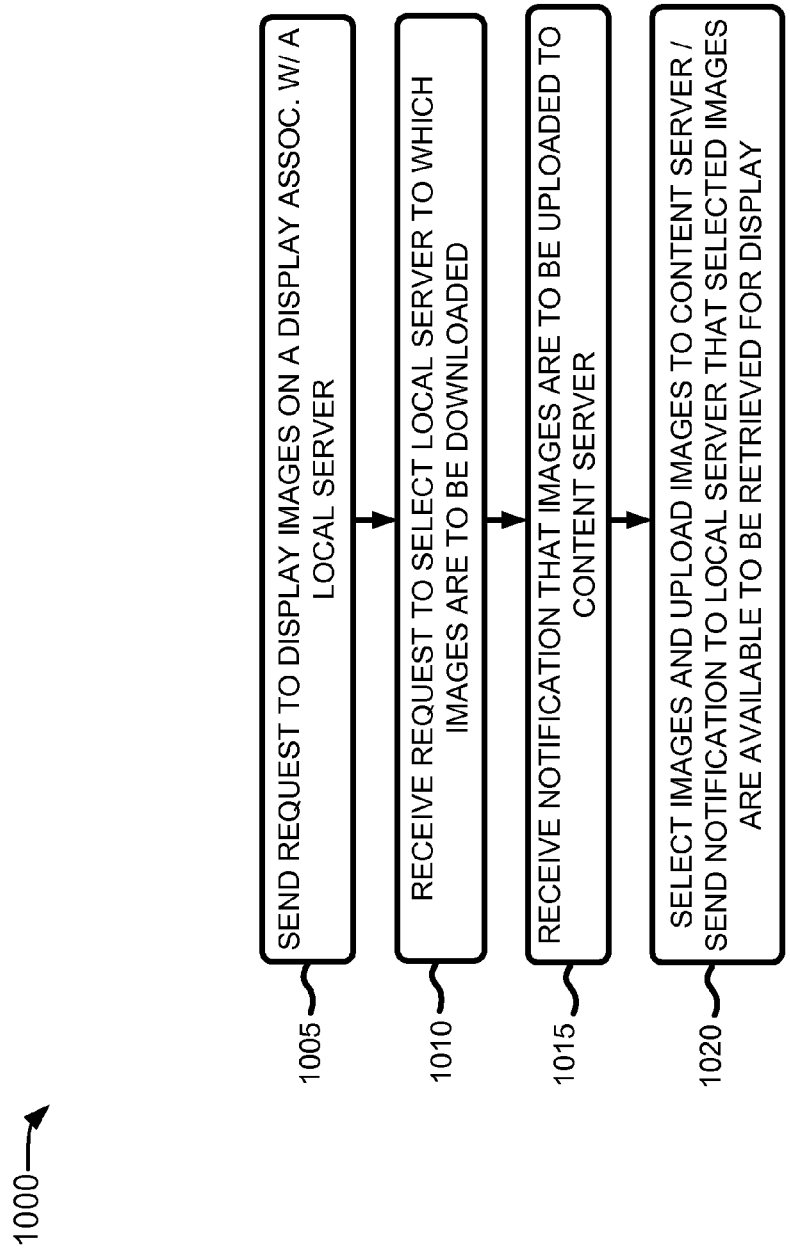
FIG. 10 is a flowchart of an example process for displaying images from a user device within the network of FIG. 2.

FIG. 10 is a flowchart of an example process for retrieving and/or displaying backed up images. In one implementation, process 1000 may be performed by user device 210, local server 220, DVR server 230, and/or content server 240. In another implementation, some or all of process 1000 may be performed by a device or collection of devices separate from, or in combination with, user device 210, local server 220, DVR server 230, and/or content server 240.

As shown in FIG. 10, process 1000 may include sending a request to upload images for display on a video display device associated with local server 220 (block 1005). For example, a user of user device 210 may desire to view images on a video display device associated with local server 220 that is a STB. In one example, the user may desire to view the images that are stored on user device 210. In another example, the user may desire to view images that are stored in content server 240 and/or database 250. In yet another example, the user may desire to view screen saver images, stored on user device 210, on the video display device associated with local server 220. The user of user device 210 may send a request to DVR server 230 to view the images on a video display device associated with local server 220. The request may include information associated with user device 210 (e.g., an MDN and/or some other identifier) and/or information associated with a user of user device 210 (e.g., a username, a password, a PIN, etc.). DVR server 230 may receive the request and may authenticate user device 210 based on the information associated with the user and/or the information associated with the user device 210 from the request and information associated with user device 210 and/or information associated with the user stored in a memory associated with DVR server 230.

As also shown in FIG. 10, process 1000 may include receiving a request to select to which device, images are to be downloaded (block 1010). For example, DVR server 230 may retrieve information associated with image settings (e.g., image settings specified by the user during a setup operation described above with respect to FIG. 6) associated with the user of user device 210. From the image settings, DVR server 230 may, for example, identify local server 220 as authorized by the user to receive images for display. In another example, DVR server 230 may identify a set of local servers 220 as authorized by the user to receive images for display. In this example, DVR server 230 may send a request to user device 210 for the user to select one or more of the authorized local servers 220 to which images, stored on user device 210 and/or database 250 are to be sent. In yet another example, DVR server 230 may send a request to user device 210 for the user to identify another local server 220 (e.g., a particular local server 220 that different than an authorized local server 220 as specified by the user in the image settings) to which images are to be sent. User device 210 may receive the request and may send an indication to DVR server 230 that includes a local server 220 selection that may include information associated with the selected local server 220 (e.g., a STB identifier, etc.).

As further shown in FIG. 10, process 1000 may include receiving a notification that selected images are to be uploaded to content server 240 (block 1015). For example, based on the receipt of a selected local server 220, DVR server 230 may send a notification to content server 240 that selected images may be uploaded from user device 210. The notification may include information associated with a selected local server 220 (e.g., an STB identifier, a network address, etc.) to which the uploaded images are to be sent. Additionally, or alternatively, DVR server 230 may send a notification to user device 210 that selected images may be uploaded to content server 240. The notification may include information associated with content server 240 (e.g., a network address, a device identifier, etc.).

As yet further shown in FIG. 10, process 1000 may include uploading selected images and sending a notification to the selected local server 220 that selected images may be retrieved for display (block 1020). For example, user device 210 may receive the notification and the user may select images stored on user device 210 to be uploaded to content server 240. User device 210 may, for example, receive an instruction from the user (e.g., when the user presses a button or series of buttons on user device 210) to upload the selected images and the image diary application may send the selected images to content server 240. Additionally, or alternatively, user device 210 may send a notification to selected local server 220 (e.g., a STB associated with a video display device on which the images are to be displayed) that selected images are available to be retrieved from content server 240.

In another example, the image diary application may send a list of image file identifiers associated with the images stored on user device 210 and content server 240 may use the list of image identifiers to determine, in a manner similar to that described above (e.g., with respect to block 920 of FIG. 9), which images are to be backed up to database 250.

Local server 220 may receive the notification from user device 210 and may, in response to the notification, retrieve the selected images from content server 240. Local server 220 may display the selected images on a video display device associated with local server 220. In another example, the notification may include an indication that one or more selected images are to be displayed as screen saver images on video display device.

Implementations described herein may provide an automatic user device backup. A user may specify backup preferences information for a user device and may register the user device with a global server. A local server may be registered with the global server. Automatic backup operations may be performed to backup a copy of the information stored by the user device. The automatic backup operation may enable a user to protect information stored by the user device, which may be recovered if the user device is lost, stolen or otherwise rendered inoperable. The automatic backup operation may be performed in a manner that is transparent to the user and may be performed in accordance with backup preferences specified by the user. The backup operation may permit information to be stored locally on a local server and/or remotely on a global server and/or global backup server. The automatic backup operation may be performed via a local network (e.g., a home Wi-Fi network), which may reduce bandwidth utilization on broadband networks. If a local network is not available, however, the automatic backup operation may be performed using a global network (e.g., a broadband network, the Internet, etc.).

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6 and 8-10, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a user device connected to a content server via a public network, the method comprising:
 accessing, by the user device, user-selected information associated with displaying and backing up of images, wherein the user-selected information associated with the backing up of the images includes at least one of a time or frequency setting;
 sending,
  to a digital video recorder (DVR) server via the public network, a request to display images on a video display device associated with one or more local servers;
 receiving, from the DVR server and via the public network, a notification that images are to be uploaded to the content server, the notification including an address associated with the content server;
 selecting, by the user device and in response to the notification, one or more images of a plurality of images stored on the user device;
 sending, by the user device and via the public network, the one or more images to the content server based on the address associated with the content server;
 sending, to at least one local server of the one or more local servers and via a local network, a notification that the one or more images are to be retrieved from the content server for display on the video display device; and
 determining, based on the at least one of time or frequency setting whether to back up the images.

2. The method of claim 1, where sending the one or more images to the content server further includes:
 sending, to the content server, a list of image file identifiers that correspond to the plurality of images stored on the user device, the list of image file identifiers enabling the content server to perform a synchronization operation with the user device.

3. The method of claim 2, further comprising:
 receiving, from the content server, an upload list that includes a list of one or more image identifiers, of the list of image file identifiers, that correspond to at least one image, of the plurality of images, that have not been stored on the content server; and
 sending, to the content server, the at least one image that has not been stored on the content server.

4. The method of claim 1, further comprising:
 sending, to the at least one local server and via the local network, an instruction for the at least one local server to retrieve other images that have been backed up on another local server, of the one or more local servers, at a prior point in time, the instruction including image identifiers associated with the other images; and
 sending, to the at least one local server, another instruction to display each of the other images retrieved from the other local server.

5. The method of claim 1, where the at least one local server is a set top box connected to the video display device.

6. The method of claim 1, where selecting the image file identifiers further includes:
 receiving, by the user device and from a user of the user device, a text description of at least one image of the one or more images;
 saving the text description as a text file associated with the at least one image; and
 sending, to the content server, the at least one image and the text file.

7. The method of claim 1, further comprising:
 retrieving, from a memory associated with the user device, image settings that include an indication of whether a user, of the user device, permits an image backup operation to be performed; and
 performing a local image backup operation based on a determination that:
  the image settings permit a local image backup operation or a remote image backup operation to be performed, and
  a connection to the at least one local server can be established via the local network.

8. The method of claim 7, where the image settings include an indication that the image backup operation is to be performed when the user device is at a particular location, the method further comprising:
 determining that the user device is at the particular location, and
 initiating the image backup operation based on the determination that the user device is at the particular location.

9. A user device, comprising:
 a memory to store image settings relating to performance of an image backup operation, wherein the image settings are user-selected settings related to at least a time or a frequency of the image backup operation; and
 a processor to:
  retrieve, from the memory, the image settings when the user device is being charged,
  establish a connection with a local server via a private network based on a determination that the user device is being charged and the image settings permit a local backup operation to be performed, identify one or more images, of a plurality of images, stored in the memory after a prior point in time that a previous image backup operation was performed;

send, to the local server and via the connection with the local server, the one or more images;

receive, from the local server, an indication that the one or more images have been received, the indication including a list of image identifiers that correspond to images stored on the local server; and send to the local server, any one or more images, stored on the user device, that do not correspond to an image identifier in the list of image identifiers.

10. The user device of claim 9, where, when establishing the connection with the local server, the processor is further to:

detect a hello notification from the local server, the hello notification being sent over the private network, and send, to the local server and via the private network, a notification that the local image backup operation is to be performed based on the detection of the hello notification.

11. The user device of claim 9, where, when establishing the connection with the local server, the processor is further to:

send, to a digital video recorder (DVR) server, a request to determine whether the local server is online or available to perform the local image backup operation, and receive, from the DVR server, an indication that the local server is online or available to perform the local image backup operation.

12. The user device of claim 9, where, before establishing the connection with the local server, the processor is further to:

wake up the user device when the user device is in a standby mode, and power up the user device when the user device is powered down.

13. The user device of claim 9, where, when identifying the one or more images stored in the memory after the prior point in time, the processor is further to:

perform at least one of:

identify one or more image file identifiers, that correspond to the one or more images, where each of the one or more image file identifiers includes a respective timestamp corresponding to a point in time that is after the prior point in time, or identify the one or more image file identifiers that are included on an upload list that correspond to the one or more images stored on the user device after the prior point in time.

14. The user device of claim 9, where the processor is further to:

send a request to a digital video recorder (DVR) server to download an image diary application, present, for display on the user device and using the image diary application, an image settings user interface (UI) via which the image settings are to be received from a user of the user device, receive, via the image settings UI, the image settings, send, to the DVR server, the image settings, and send, to the local server, a notification to register with the DVR server that enables the local server to perform local image backup operations or image display operations.

15. The user device of claim 9, where the processor is further to:

send, to a digital video recorder (DVR) server a request to display screen saver images on a video display device associated with the local server;

receive, from the DVR server, a notification that the screen saver images are to be uploaded to a content server, the notification including an address associated with the content server;

send the screen saver images to the content server using the address associated with the content server, send, to the local server a notification that the screen saver images are to be retrieved from the content server for display on the video display device, and send, to the local server, one or more instructions to display each of the screen saver images on the video display device.

16. The device of claim 9, where the processor is further to:

determine, at a later point in time, that another image back up operation is to be performed on another one or more images based on the image settings;

determine that a connection with the local server cannot be established, and perform a remote image backup operation based on the determination that the local connection with the local server cannot be established and that the image settings permit a remote image backup operation to be performed, where the remote image backup operation includes uploading, via a public network, the other one or more images to a content server.

17. The device of claim 9, where the processor is further to:

determine, at a later point in time, that another image back up operation is to be performed on another one or more images based on the image settings;

determine that a connection with the local server cannot be established, and perform a temporary remote image backup operation based on the determination that the local connection with the local server cannot be established, where the temporary remote image backup operation includes uploading, via a public network, the other one or more images to a content server until the connection with the local server can be reestablished.

18. A system comprising:

a user device, connected to a first server and a second server via a public network and to one or more local servers via a private network, to:

store, in a memory associated with the user device, image settings that include an indication whether a remote backup operation is permitted by a user of the user device and an identification of at least one local server of the one or more local servers that is authorized by the user to perform an image display operation, and wherein the image settings further include user-selected information relating to at least one of a time or frequency setting for backing up images, send, to first server and via the public network, a request to perform the image display operation, receive, from the first server and via the public network, an instruction to select a local server, of the at least one local server, with which to perform the display operation, send, to the first server and via the public network, selection of the local server, of the at least one local server, in response to the instruction, receive, from the first server and via the public network, another instruction to upload images that includes an address associated with the second server, select, in response to the other instruction, one or more of a plurality of images, send, to the second server and using the address, the one or more of the plurality of images and a list of identifiers associated with the plurality of images, receive, from the second server and via the public network, an upload list that includes at least one identifier corresponds to at least one of the plurality of images that has not yet been backed up on the second server, send, to the second server and using the address, the at least one of the plurality of images based on the indication that a remote image backup operation is permitted, and send, to the local server and via the private network, a notification that the one or more of the plurality of images can be retrieved from the second server for display on the display device.

19. The system of claim 18, where, the user device is further to:

retrieve, from the memory, the image settings that include a time interval by which a local mage backup operation is to be performed, determine whether a connection with the one or more local servers can be established, via the private network, based on a determination that an elapsed time, since a previous local image backup operation was performed, is greater than the time interval, and send the one or more of the plurality of images to another local server, of the one or more local servers, based on a determination that a connection with the other local server can be established via the private network.

20. The system of claim 18, where the user device is further to:

determine that a quantity of times that the user manually performs an image backup operation, within a particular period of time, is greater than a threshold, and automatically perform the image backup operation within the period of time based on the determination that the quantity of times that the user manually performs the image backup operation is greater than the threshold.

21. The system of claim 18, where, when selecting the one or more of the plurality of images, the user device is further to:

receive the one or more of the plurality of images from a third server device.

22. The system of claim 18, where the user device is further to:

send, to the local server and via the private network, one or more instructions for the local server to display each of the one or more of the plurality of images retrieved from the content server.

23. The system of claim 18, where the user device is further to:

retrieve, from the memory, the image settings that include an indication that an image backup operation is to be performed during a period that the user device is being charged, identify that the user device is being charged, and initiate an image backup operation based on the identification that the user device is being charged and the indication that the image backup operation is to be performed during the period that the user device is being charged.

24. The system of claim 23, where the user device is further to:

establish a connection with another local server of the one or more local servers via the private network based on a determination that the user device is being charged and the image settings permit the local image backup operation to be performed;

send, to the other local server and via the connection with the other local server, the one or more of the plurality of images;

receive, from the other local server, an indication that the one or more of the plurality of images have been received, the indication including a list of identifiers that correspond to all images stored on the other local server;

determine that at least one identifier of the list of identifiers corresponds to at least one image that is not stored on the user device; and send, to the other local server and via the connection to the other local server, an instruction to delete the at least one image that corresponds to the at least one identifier.

25. The system of claim 18, where the user device is further to:

receive or transmit synchronization information that identifies at least one image that is not stored by both the user device and one of the one or more local servers, when the at least one image is stored by the one of the one or more local servers and not the user device, send a confirmation or a deletion request to the one of the one or more local servers regarding the at least one image, and when the at least one image is stored by the user device and not by the one of the one or more local servers, identify the at least one image for backup to the one of the one or more local servers.

* * * * *